July 5, 1966  H. D. WILSON  3,259,525
METHOD FOR ASSEMBLY OF BATTERIES
Filed Oct. 3, 1962

HARLAND D. WILSON
INVENTOR

BY John R. Faulkner
Thomas H. Oster

ATTORNEYS

United States Patent Office 3,259,525
Patented July 5, 1966

3,259,525
METHOD FOR ASSEMBLY OF BATTERIES
Harland D. Wilson, Lathrup Village, Mich., assignor to Ford Motor Company, Dearborn, Mich., a corporation of Delaware
Filed Oct. 3, 1962, Ser. No. 228,098
4 Claims. (Cl. 136—176)

This invention is concerned with a system for the construction of storage batteries. This invention is especially concerned with a method for assembling multi-cell lead-acid storage batteries which offers a distinct improvement over methods now known and which produces a superior product at a lesser cost.

A particular object of this invention is to produce a multi-cell lead-acid storage battery in which all the inter-cell connectors are completely protected within the battery cover and in which leakage of acid from cell to cell and hence slow self-discharge along the acid path is prevented.

Figure 1:
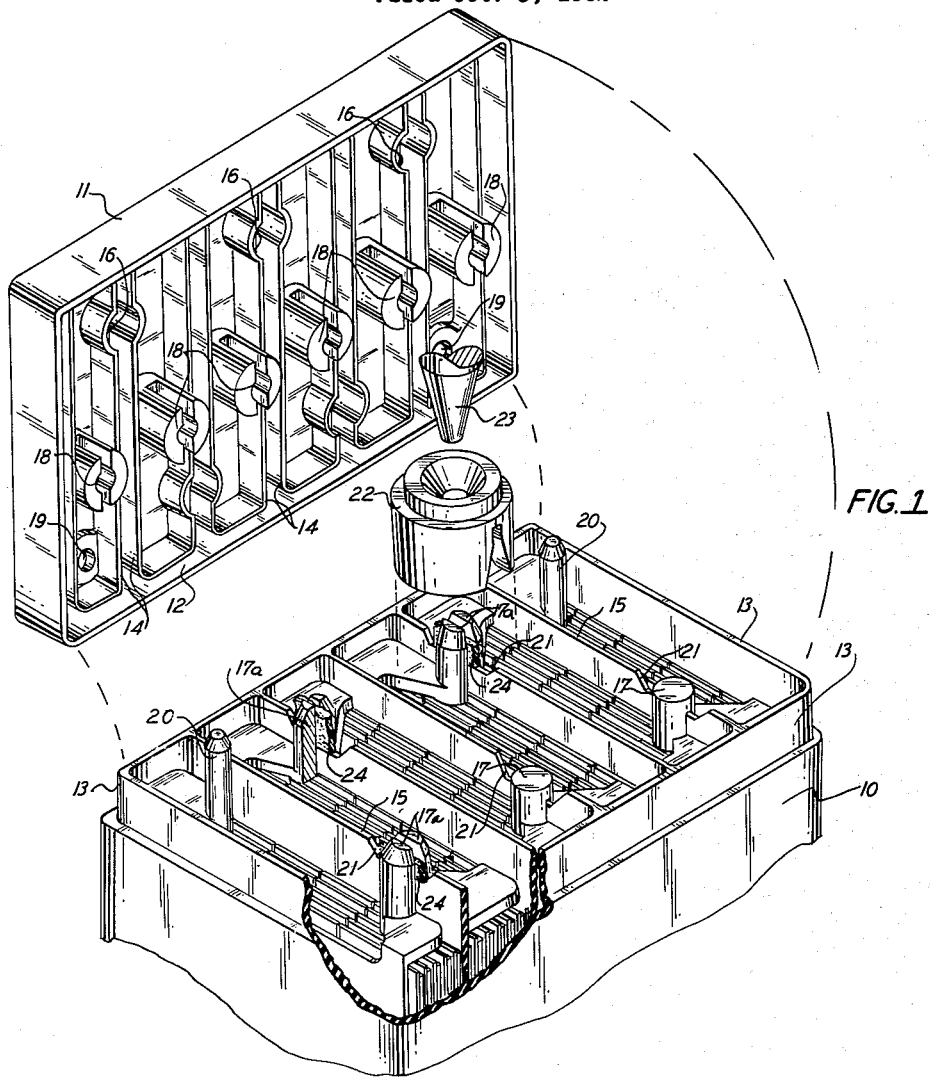
Figure 2:
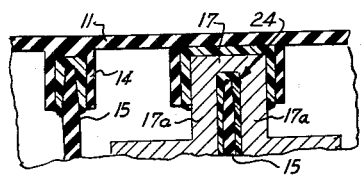

The method of obtaining these objectives is best understood by a study of the drawings, in which:

FIGURE 1 is a somewhat schematic exploded view of a partially assembled battery, and FIGURE 2 is a cross section taken longitudinally through the battery and including one inter-cell partition and one inter-cell connector.

Structurally this battery is composed of a case 10 and a cover 11 of conventional composition. Cover 11 is provided with peripheral grooves 12 and transverse grooves 14. Peripheral grooves 12 and transverse grooves 14 coact respectively with peripheral tongues 13 and transverse tongues 15 in the case. Transverse tongues 15 are, in reality, a direct upward extension of the cell walls which must be provided between each of the adjacent cells. Transverse grooves 14 in cover 11 are provided with enlarged portions 16 for the accommodation of inter-cell connectors 17. The inter-cell connectors designated by the numeral 17 have been burned or fused and are completed. The adjacent cell terminal posts designated 17a must be fused or burned together prior to the assembly of the battery case 10 and the cover 11. Cover 11 is further provided with filling openings 18 and terminal bushings 19. Bushings 19 are provided for the reception of end-cell terminals 20 which may be seen projecting above the upper surface of case 10. Transverse tongues 15 in the case are provided with notches 21 in each partition tongue.

The round object shown in FIGURE 1 is a steel mold 22 adapted to be lowered around unfused cell terminal posts 17a and inter-cell partitions. When steel mold 22 has been lowered around unfused cell terminal posts 17a, heat is applied from torch 23. The heat from torch 23 melts the upper portion of unfused cell terminal posts 17a. The molten lead is confined in steel mold 22 and cools to form completed inter-cell connectors 17. The steel mold 22 forms no part of the battery and is removed prior to the assembly of the case and cover. Completed inter-cell connectors 17 are snugly received in enlarged portions 16 in transverse grooves 14 in cover 11 when applied to the container 10.

Prior to the application of flame to the unfused cell terminal posts 17a, an insert 24 is placed in each notch 21 between the portions of unfused cell terminal posts 17a which project above the base of notch 21. The chemical composition of plastic inserts 24 forms no part of this invention. It is only required that this be such that the insert is temporarily capable of supporting molten lead and of forming under the influence of heat an acid-tight seal with the lead of the fused inter-cell connectors 17 and the material of transverse tongues 15. Inserts 24 must be stable to the action of sulfuric acid and battery cycling.

A suitable resin is commercially available under the trade name "Loxite." Batteries have been successfully fabricated employing, as this plastic, a heat hardenable thixotropic epoxy base resin in amount sufficient to provide a bed on the bottom of the notch 21 for supporting the molten cell connector 17 and filling the space between connector 17 and notch 21.

The adjacent unfused cell terminal posts 17a are now fused, employing torch 23 and mold 22. The cell connector 17 can also be formed by pouring the molten metal between the two opposing posts 17a resulting in a fusion of the two posts.

The molten metal is allowed to embed itself in the soft epoxy resin inserts 24. After each of the inter-cell connections has been burned, in order to accelerate the hardening of the resin, the assembly is optionally subjected to radiant heat to raise the temperature of the top three-quarters of an inch of the cover structure to a temperature of from 200 to 250° F. This is done by passing the assembly below rows of 250 watt radiant heat lamps.

Peripheral grooves 12 and transverse grooves 14 in cover 11 are now filled with thixotropic resin after the covers have been optionally heated to a temperature of from 175 to 225° F. The cover 11 is then quickly assembled on case 10 and a weight is applied to the cover 11 to hold it in the snug engagement with the case 10. While so weighted, the cover 11 is heated to a temperature of from 225 to 275° F. by a five-minute exposure to radiant heat lamps.

Batteries so constructed are capable of withstanding a pressure of three to five pounds of air without leakage and may immediately be lifted for transport by their terminals.

The application of the thixotropic epoxy base resin insert 24 to notches 21 prior to the fusing together of the inter-cell connectors 17a makes it possible to seal completely each cell of the battery without the necessity for the inversion of the assembly. In processes in which insert 24 is not first used, it is necessary to invert the battery assembly and drop the tongues into the upturned grooves to permit a fluid type resin in the peripheral grooves 12 and 14 to seal the gap between the metal of the inter-cell connectors 17 and the bottom of notches 21. This inversion step has required that the elements be shimmed in the cells. This shimming step is costly and the shims used are objectionable in the completed battery.

I claim:
1. The process of manufacturing a multi-cell lead-acid storage battery comprising providing a battery case including transverse cell walls which terminate at their upper end as transverse tongues, notching the upper surface of the transverse tongues, positioning a portion of opposing cell terminal posts from two adjacent cells in proximity to each other and to the notches so provided, applying to the notches so provided a sealing resin capable of temporarily supporting molten lead and of forming an acid tight seal with the lead and applying heat to the adjacent cell terminal posts to fuse them together and complete the connection between the adjacent cells.

2. The process of manufacturing a multi-cell lead-acid storage battery comprising providing a battery case including transverse cell walls which terminate at their upper end as transverse tongues, notching the upper surface of the transverse tongues, positioning a portion of opposing cell terminal posts from two adjacent cells in proximity to each other and to the notches so provided, applying to the notches so provided a sealing resin capable of temporarily supporting molten lead and of forming an acid tight seal with the lead, applying heat to the adjacent cell terminal posts to fuse them together and complete the connection between the adjacent cells and assembling the battery cover and battery case without the inversion of the battery cell assembly.

3. The process of manufacturing a multi-cell lead-acid storage battery comprising providing a battery case including transverse cell walls which terminate at their upper end as transverse tongues, notching the upper surface of the transverse tongues, positioning a portion of opposing cell terminal posts from two adjacent cells in proximity to each other and to the notches so provided, applying to the notches so provided a sealing resin capable of temporarily supporting molten lead and of forming an acid tight seal with the lead and applying molten lead to the adjacent cell terminal posts to fuse them together and complete the connection between the adjacent cells.

4. The process of manufacturing a multi-cell lead-acid storage battery comprising providing a battery case including transverse cell walls which terminate at their upper end as transverse tongues, notching the upper surface of the transverse tongues, positioning a portion of opposing cell terminal posts from two adjacent cells in proximity to each other and to the notches so provided, applying to the notches so provided a sealing resin capable of temporarily supporting molten lead and of forming an acid tight seal with the lead, applying molten lead to the adjacent cell terminal posts to fuse them together and complete the connection between the adjacent cells and assembling the battery cover and battery case without the inversion of the battery cell assembly.

References Cited by the Examiner

UNITED STATES PATENTS

| | | | |
|---|---|---|---|
| 2,002,267 | 5/1935 | Kyle | 136—134.5 |
| 2,180,463 | 11/1939 | Dunzweiler | 136—134.5 |

WINSTON A. DOUGLAS, *Primary Examiner.*

JOHN H. MACK, *Examiner.*

D. L. WALTON, *Assistant Examiner.*